United States Patent
Sterzing et al.

(10) Patent No.: US 6,212,508 B1
(45) Date of Patent: *Apr. 3, 2001

(54) PROCESS AND ARRANGEMENT FOR CONDITIONING AN INPUT VARIABLE OF A NEURAL NETWORK

(75) Inventors: Volkmar Sterzing; Volker Tresp, both of München; Jörg Maschlanka, Gaggenau, all of (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/809,210

(22) PCT Filed: Sep. 13, 1995

(86) PCT No.: PCT/DE95/01233

§ 371 Date: Mar. 17, 1997

§ 102(e) Date: Mar. 17, 1997

(87) PCT Pub. No.: WO96/08776

PCT Pub. Date: Mar. 21, 1996

(30) Foreign Application Priority Data

Sep. 15, 1994 (DE) ................................. 44 32 932
Jun. 29, 1995 (DE) ............................... 195 23 776

(51) Int. Cl.$^7$ ....................................... G06N 3/06

(52) U.S. Cl. ............................... 706/15; 706/16

(58) Field of Search ................... 706/16, 21, 25, 706/15; 702/4

(56) References Cited

U.S. PATENT DOCUMENTS

| 5,140,523 | * | 8/1992 | Frankel et al. ........................... 706/4 |
| 5,255,347 | * | 10/1993 | Matsuba et al. ....................... 706/25 |
| 5,307,444 | * | 4/1994 | Tsuboka ................................. 706/20 |
| 5,349,541 | * | 9/1994 | Alexandro, Jr. et al. ............. 364/578 |
| 5,463,718 | * | 10/1995 | Maeda et al. .......................... 706/12 |
| 5,479,573 | * | 12/1995 | Keeler et al. ............................ 706/21 |
| 5,729,661 | * | 3/1998 | Keeler et al. ........................... 706/16 |

FOREIGN PATENT DOCUMENTS

WO 94/17489   8/1994   (WO).

OTHER PUBLICATIONS

Kosko, Bart, Neural Networks and Fuzzy Systems: A Dynamical Systems Approach to Machine Intelligence, Prentice Hall, (1992), pp. 138, Jan. 1, 1992.*

(List continued on next page.)

Primary Examiner—Tariq R. Hafiz
Assistant Examiner—Wilbert L. Starks, Jr.
(74) Attorney, Agent, or Firm—Schiff Hardin & Waite (57) ABSTRACT

A process and an arrangement for conditioning input variables of a neural network are described by the invention. From the input variables of the network, time series are formed and these are subdivided into intervals whose length depends on how far the interval and the measured variables contained therein lie back in the past. In this case, the interval length is selected to be larger the further the interval lies back in the past. By means of convolution using a bell-shaped function, a representative input value for the neural network is obtained from all these measured variables contained in the interval. All the input variables which are obtained in this way are fed to the network simultaneously during training and during operation. A memory is thus realized in a simple way for a forwardly directed neural network. Potential applications include, in particular, chemical processes having very different time constants.

13 Claims, 4 Drawing Sheets

OTHER PUBLICATIONS

M. Kokkonen et al., "Using Self–Organizing Maps and Multi–Layered Feed–Forward Nets to Obtain Phonemic Transcriptions of Spoken Utterances", European Conference on Speech Communication and Technology, Paris—Sep. 1989, vol. 2, pp. 561–564.

N. Hataoka et al., Speaker–Independent Phoneme Recognition on Timit Database Using Integrated Time–Delay Neural Networks (TDNNs), IJCNN International Joint Conference on Neural Networks, San Diego, Jun. 19990, vol. 1, IEEE, pp. 57–62.

F. Greco et al., "A Recurrent Time–Delay Neural Network for Improved Phoneme Recognition", Speech Processing 1, vol. 1, ICASSP 91, IEEE, pp. 81–84.

J. Leonard et al., "Diagnosing Dynamic Faults Using Modular Neural Nets", IEEE Expert, vol. 8, No. 2, Apr., CA, US, pp. 44–53.

V. Sterzing et al., "Recurrent Neural Networks for Temporal Learning of Time Series", in Proceedings of the 1993 International Conference on Neural Networks, pp. 843–850.

H. Zimmerman, Neuronal Netz als Entscheidungskalkül, pp. 74–79.

Hergert et al., "Evaluation of Pruning Techniques", Esprit Project 5293–Galatea, Aug. 1992, 38 pages.

Hergert et al., "A Compariosn of Weight Elimination Methods for Reducing Complexity in Neural Networks", Balitmore, 1992, pp. III–980–III987.

* cited by examiner

PROCESS AND ARRANGEMENT FOR CONDITIONING AN INPUT VARIABLE OF A NEURAL NETWORK

BACKGROUND OF THE INVENTION

1. Field of the Invention

The present invention relates generally to a process for the neural modeling of dynamic processes having very different time constants.

2. Description of the Related Art

Neural networks are employed in the most diverse of technical fields. Neural networks have proven to be particularly suitable anywhere where decisions are to be derived from complex technical relationships and from insufficient information. To form one or more output variables, for example, one or more input variables are fed to the neural network. For this purpose, such a network is initially trained for the specific use and is subsequently generalized and is then validated using a data set other than the training data. Neural networks prove to be particularly suitable for many uses, since they are universally trainable.

A problem which often occurs in conjunction with the use of neural networks is, however, that the number of inputs of the neural network is often too large and hence the network appears to be unnecessarily complex for the application. In particular, the excessively large neural network does not reach the required performance on the generalization data during training. It then often learns application examples by heart rather than learning the problem structure. In practice, it is therefore desirable to limit the number of possible input variables as far as possible to those that are necessary, that is to say to the number of input variables which have the greatest effects on the output variables that are to be determined. The problem may also arise in practice that a neural network is intended to be supplied with input variables which arise at different times, some of which are located hours or days apart. For such eventualities, for example, recurrent neural networks are used. These networks contain feedback paths between the neurons internally and it is thus possible for them to construct a type of memory about the input variables which have arisen. However, because of the simpler handling, in particular because they are more easily trainable, forwardly directed neural networks often appear desirable in the field of use.

In the case of industrial processes, in particular in the case of biochemical processes, different partial processes having very different time constants often interact. Chemical reactions often take place in a fraction of a second. During the degradation or synthesis of materials by microorganisms and the growth and death of bacteria or fungi, time constants of hours or days often occur. Time constants in the range of hours and days occur in particular in systems in which there are material circulations having feedback and intermediate storage. Separate treatment of the partial processes, which progress at different speeds, is often not possible. Thus, for example, there is a close coupling between the individual processes proceeding in the purification of sewage. In addition, measured values "between" the individual processes can be obtained only at very high cost, if at all, as a precondition for separate neural modeling. This is true in particular in the case of the biochemical processes which proceed in sewage treatment in sewage treatment plants.

A suitable representation of the input data, in conjunction with the selection of relevant process information by means of the neural network, is the precondition for being able to model the simultaneous action of different time constants neurally.

In order to be able to model very rapidly progressing partial processes neurally, on the one hand it is necessary for data to be obtained at a very high sampling rate and to be applied to the neural network as input variables. On the other hand, for modeling the slowly progressing processes, the data over a range reaching appropriately far back into the past are to be applied as input values to a forwardly directed network. This method of proceeding has the disadvantage that the neural network has a large number of inputs even with just a small number of measured variables and hence has a large quantity of adaptable parameters. As a result of this high number of free parameters, the network has a complexity which is higher than is appropriate for the data, and tends to "overfitting", see the references Hergert, F., Finnoff, W., Zimmermann, H. G.: "A comparison of weight elimination methods for reducing complexity in neural networks", in Proceedings of the Int. Joint Conf. on neural networks, Baltimore, 1992, and Hergert, F., Finnoff, W., Zimmermann, H. G.: "Evaluation of Pruning Techniques", ESPRIT Projekt Bericht [Project Report] 5293 - Galatea, Doc. No.: S23.M12.-August 1992. Thus, in the case of the data points used for training, the neural network indeed reaches a very good approximation to the data. In the case of the "generalization data" not used for training, networks having too many adaptable parameters exhibit poor performance. An alternative possibility for the neural modeling of processes having very different time constants are recurrent neural networks (RNN). Because of the feedback which is realized in the network, RNN are capable of storing information from previous data and thus of modeling processes having long time constants or having feedback. The disadvantage of RNN is that simple learning processes such as, for example, back propagation, can no longer be used and, instead, specific learning processes such as, for example, Real Time Recurrent Learning (RTRL) or Back Propagation Through Time (BPTT) must be employed. Especially in the case of a high number of data points, RNN are difficult to train and tend to numeric instability, see the reference Sterzing, V., Schirmann, B.: "Recurrent Neural Networks for Temporal Learning of Time Series", in Proceedings of the 1993 Internation Conference on Neural Networks, March 27–31, San Francisco 843-850.

The international potent publication WO-A-94/17489 discloses a Back Propagation network which defines preprocessing parameters and time delays in the training mode. In the operating mode, the operating data are then processed together with the preprocessing parameters and, together with the defined time delays, are fed into the system as input data. Such a network is particularly suitable for applications in which the input data are based on different time scales.

The journal article IEEE EXPERT, Volume 8, No. 2, Apr. 1, 1993, pages 44 to 53, by J. A. Leonard and M. A. Kramer: "Diagnosing dynamic faults using modular neural nets" discloses general possibilities of the diagnosis of dynamic errors in modular networks. In that publication, for example, the time aspect of input data is taken into account in that each time a new input data set is added, the oldest data set is dispensed with and the system then carries out a new calculation. By this means, the number of input data sets to be taken into account by the system in each case is kept within limits. In the prior art cited, therefore, limited possibilities are indicated for taking into account the past of the system. Furthermore, their different techniques are extensively explained. No further relevant prior art is known.

An object on which the invention is based is to provide an arrangement and a process with which the number of input variables arising over time of a neural network can be reduced in a practical manner. It is intended, in particular, by means of the inventive process and the inventive arrangement to realize a memory, on remembrance for forwardly directed neural networks. Furthermore, it is intended that the inventive process shall meet the special requirements which underlie chemical processes having different time constants.

This and other objects and advantages are achieved in a process for conditioning an input variable of a neural network, a) in which a time series is formed from a set of values of the input variable by determining the input variable at discrete times, b) in which, from the time series, at least a first interval is delimited in such a way that the length of the interval is selected to be greater the further the values therein lie back in the past, c) in which the first partial time series delimited by the first interval is convoluted with an essentially bell-shaped function to form an average and the first maximum value of the convolution result is formed, d) and in which the neural network is fed the first maximum value which is representative of the first partial time series essentially simultaneously with another input value which is located within the time series but outside the first interval.

A control arrangement is also provided by the present invention, for example for a chemical process, a) in which at least one sensor is provided for acquiring a first measured value, b) in which at least one memory is provided for storing measured values, c) in which a processor is provided for measured values stored in the memory, d) in which a forwardly directed neural network is provided, e) and in which at least one effector is provided for influencing the chemical process, f) and in which there is stored in the memory a time series, formed from a set of measured values measured at regular time intervals, which series is fed to the preprocessor, the latter combining a plurality of measured values in one interval in such a way that the length of the interval is selected to be greater the further the measured values located therein lie back in the past, and deriving a single value therefrom by means of convolution with a bell-shaped curve, and feeding this value, together with a further value from the time series stored in the memory, to the neural network, from which values the latter forms a manipulated variable for the chemical process, and in which control arrangement this manipulated variable is forwarded to the effector.

Additional developments of the invention provide that the process as described above includes a plurality of interval groups being delimited, in each case at least two successive intervals of such an interval group having the same length, and in which a process analogous to that above is followed for the determination of the respective interval length of an interval group.

The process preferably provides that the interval limits of two adjacent intervals are selected such that the intervals have at least one value from the time series in common. The width of the bell-shaped curve has essentially the same length as the respective interval to be convoluted therewith. A Gaussian distribution is selected as the bell-shaped curve of an exemplary embodiment. A standard deviation of the magnitude of the interval length is used. The input values are derived from a system which has at least one known time constant, and in which at least one interval length of the magnitude of the time constant, or a multiple thereof, is selected. The input values are fed to a forwardly directed neural network. The values of the series are normalized to a fixed interval.

The present process is used both during training and during operation of the neural network. In a first step, unconvoluted values from the time series are fed to the neural network for training and, in a second step, said network is trained with the input variables which result from the convolution of values from the time series from the past.

At least one time series is formed from measured values from a sewage treatment plant.

A particular advantage of the process according to the invention is that it allows process data to be taken into account over a very long period of time, in that a large measured value interval is used for measured values which lie back over a relatively long time period, and a sensible average is obtained from this interval by means of a convolution. A suitable selection of the convolution curve and the interval size thus makes it possible to introduce a specific damping, or attenuation, over time into the consideration of the individual input values, in that, for example, measured values which lie further back are convoluted over a longer interval and using a flatter bell curve.

In the process according to the invention, a different interval size can advantageously be introduced for the purpose of accurately taking into account the time-dependent input variables, the interval becoming ever greater in the direction of the past, it also being advantageously possible, for example, to form different interval groups which have the same length.

In the case of the process according to the invention, provision is advantageously made for selecting the intervals in such a way that they mutually overlap, since thus each value in the time series is used for determining the overall input variables of the neural network. The weighting of the individual values of the time series in this case becomes, for example, more homogeneous the greater the overlapping range of the individual intervals.

Preferably, the width of the bell curve with which the time series is convoluted within the interval is selected such that it corresponds in magnitude to the length of the interval, because in this way a sensible convolution result is obtained which, in practice, corresponds to the values acquired within the interval.

Preferably, a Gaussian bell curve is selected as convolution curve, since this curve approximates statistical processes in nature and thus appears to be particularly accurately adapted to the values within the time series. For this purpose, the standard deviation is in particular selected to be as wide as the length of the interval.

Preferably, in the process according to the invention, provision is made for forming the input data of the neural network as a time series of a process which has different time constants, and to take these time constants into account in dividing up the intervals of the time series, to be specific in such a form that the interval length corresponds to multiples of this time constant or of the several constants. It is thus ensured that the time behavior of the process to be monitored or controlled can be particularly accurately approximated by the process according to the invention.

Preferably, the process according to the invention is carried out using a forwardly directed neural network, since these have no memory and, by means of the method according to the invention, the past is taken into account in a manner in which it can replace a memory for these networks.

Preferably, the input variables of the neural network are normalized to one range, in order to make more rapid and better training of the network possible.

Preferably, the process according to the invention is used both during training of the network and in the operation of the same, since only in this way is it ensured that the learned behavior also produces the results which are desired in practice.

The process according to the invention is particularly advantageously used to control a chemical process which has different time constants, in particular the input data can in this case be obtained from a sewage treatment plant, since there time constants of up to 72 hours, in addition to rapidly changing time constants, often play a part.

Particularly advantageous is a device according to the invention which has a measuring sensor, a memory for storing the measured values of this sensor, a preprocessor for conditioning the measured values, for example in accordance with the method according to the invention, and a neural network which evaluates the input data which has been generated and obtains from them a value which is fed to the effector in order to influence the chemical process. In this way, a particularly simple control arrangement is realized.

BRIEF DESCRIPTION OF THE DRAWINGS

The invention is further explained below by reference to figures, in which.

DETAILED DESCRIPTION OF THE PREFERRED EMBODIMENTS

Figure 1:
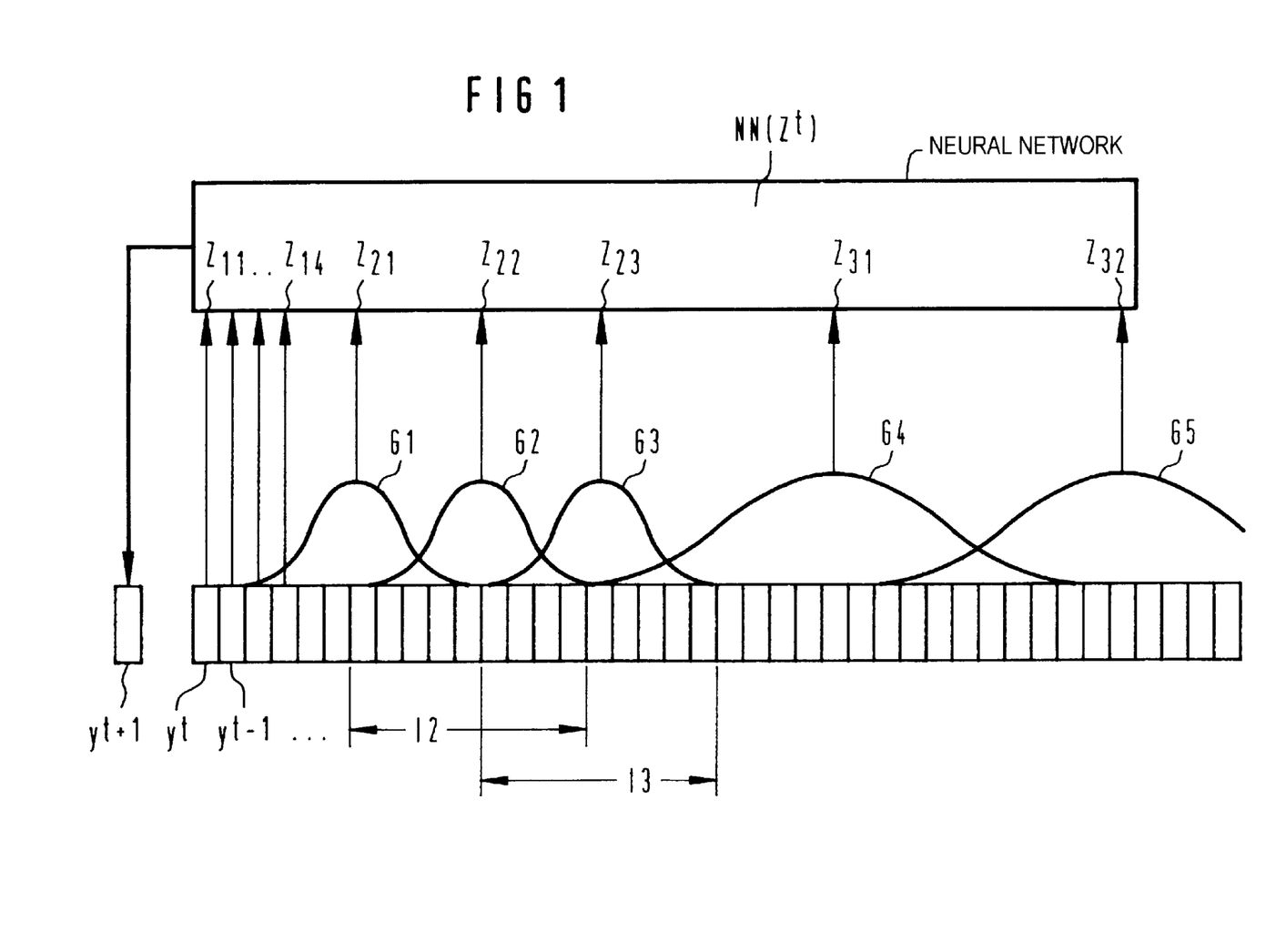
FIG. 1 shows a schematic representation of the process according to the invention.

FIG. 1 shows a block diagram as a representation of the process according to the invention. In particular, the neural network NN($Z^t$) is represented here. Furthermore, a time series of input values of the neural network $y^t$, $y^{t-1}$ . . . far back into the past is represented. Input variables $Z_{11}$ to $Z_{32}$ are fed to the neural network. It is intended therewith to forecast an input value $y^{t+1}$, lying in the future, as output variable.

The time series y represented consists, for example, of measured values recorded discretely at different times by a measured value transmitter which records input variables for the neural network. As can be seen from this example, the first four measured values $Z_{11}$ to $Z_{14}$ are forwarded directly to the neural network, in order thus to be able to take account of current input variables with particular emphasis. For values lying further back in the past, for example, intervals I2 and I3 are defined. For example, for these intervals an interval length of 9 input variables has been selected. The interval I2 is, for example, convoluted using a bell-shaped curve G2 in order to obtain the measured value $Z_{22}$ as the maximum of the convolution result. This value is forwarded to the neural network as representative of all the input variables present in the interval I2. This procedure is carried out in a manner analogous to the finding of the input variables $Z_{21}$ and $Z_{23}$ for the neural network. In so doing, it should be noted that the individual intervals I2 and I3 overlap. This overlapping is advantageously prescribed in order to be able to take into account each individual measured value of the time series for forming an input variable for the neural network. Moreover, it can be seen from FIG. 1 that the interval length increases toward the past. This means that the further the measured values or the input variables acquired in the time series lie back in the past, the longer is the interval selected to be, in order still to be able to obtain just one statistical expression of these values. The interval for the curve G4 is, for example, 19 measured values long, if it is assumed that the width of the bell curve used for the convolution corresponds approximately to the length of the interval.

Because of the relatively great flexibility during the development of the neural model and the better stability of the learning process, use is preferably made in the process according to the invention of forwardly directed neural networks.

The basic idea of the process which is proposed is that the exact values from the direct past are needed only for those partial processes having very small time constants. In the case of processes having very long time constants, the difference between the $i^{th}$ and the $i+1^{th}$ measured value generally has no significance. Therefore, it is possible to use just a few values which have been averaged over a relatively long time.

The following process results from this basic idea. Each series of input data is represented by a hierarchy of larger and smaller, time-delayed "windows". For this purpose, the original time series is, for example, convoluted using Gaussian bell curves of appropriately different variance. In order to represent the data for partial processes having very large variance, the time series convoluted using Gaussian bell curves of large variance are displaced by correspondingly large amounts of time. Thus, all the essential information may be represented to the neural network with just a few input variables in spite of long time constants. At the same time, the use of time series which are convoluted with Gaussian bell curve of small variance and displaced by small amounts allows a sufficiently accurate representation of the progress of partial processes having small time constants. Procedures which proceed very rapidly may also be represented by directly using the unconvoluted time series and the immediately previous values.

From the time series $$y^t, y^{t-1} \ldots, y^{t-N}$$

it is intended to predict the next value of the series $y^{t+1}$ by means of a neural network. For this purpose, $$Z^t_{i,j} = \sum_{k=0}^{N} y^{t-k} \frac{1}{\sqrt{2\pi\sigma_i^2}} \exp\left(-\frac{(k - j\Delta_i)^2}{2\sigma_i^2}\right)$$

is formed, with $i = 1, \ldots, M$ : Width of the Gaussian bell curves $j = 1, \ldots, K_i$ : Delay $K_i < = N/\Delta_i$ : Number of values offered for each $i$ For i=1, for example, $\sigma_i=0$, $\Delta_i=1$, $K_i=4$ are selected
For i=2, for example, $\sigma_i=10$, $\Delta_i=10$, $K_i=3$ are selected, here an appropriately large averaging process is carried out. A matrix Z is formed using the element $z_{i,j}$, the matrix representing the input to the neural network. The prediction of the neural network NN can thus be described as:

$$y^{t+1} = NN(Z^t)$$

The use of the Gaussian bell curve for the convolution here is only one possible realization for "smoothing" the time series. Knowledge of the system and of the time constants present in the system allow the variance of the Gaussian bell curve for convolutions and the magnitudes of the time displacements to be selected in a suitable manner and the decisive information to be offered to the neural network with just a few inputs. Before the neural processing, a scaling of the input variables $x_{i,j}$ is preferably carried out. The scaling increases the speed during learning and prevents "overcontrolling" during the adaptation of parameters belonging to very small input variables.

Very good modeling is possible if, in addition to the original data series, during training those inputs which are highly time-delayed and have been convoluted using Gaussian bell curve of large variance are activated first. Additional information is offered step by step to the neural network by activating the "more weakly" convoluted and less time-delayed input values. After training of the neural network has been carried out using all the input variables $z_{i,j}$, the sensitivity of the network output to the input variables is investigated. The input variables $z_{i,j}$ which are important for modeling the process are selected by the neural network based on the sensitivity analysis Rehkugler, H., Zimmermann, H. G.: "Neuronale Netze in der Ökonomie" [Neural Networks in the Economy], Chapter 1: H. G. Zimmermann—"Neuronalen Netze als Entscheidungskalkül" [Neural Networks as a Decision Calculus]—Munich: Vahlen, 1994. ISBN 3-8006-1871-0. Only these input variables are used for training the network. As a result of this restriction of the number of network parameters and of the complexity, very good modeling of the processes is possible.

Network parameters having severe scatter in relation to their magnitude are, for example, deleted, since these do not supply any contribution which is relevant to the network output.

In FIG. 1, in particular, it should be noted that all the values of, therefore, $Z_{11}$ to $Z_{32}$ are fed to the neural network at the same time, in order to determine therefrom the output variable $y^{t+1}$. In that the process according to the invention also takes into account values in the past by means of the convolution, a memory, or remembrance, is advantageously realized even for forwardly directed neural networks. Thus, this disadvantage of having no memory, or remembrance, is eliminated for forwardly directed neural networks, their advantages of being simple to train being retained. It is also to be noted that in the inventive procedure, a value which is located in a respective interval can be assigned to a plurality of intervals, with the result that this value can also be subjected many times to a convolution using different convolution functions.

Figure 2:
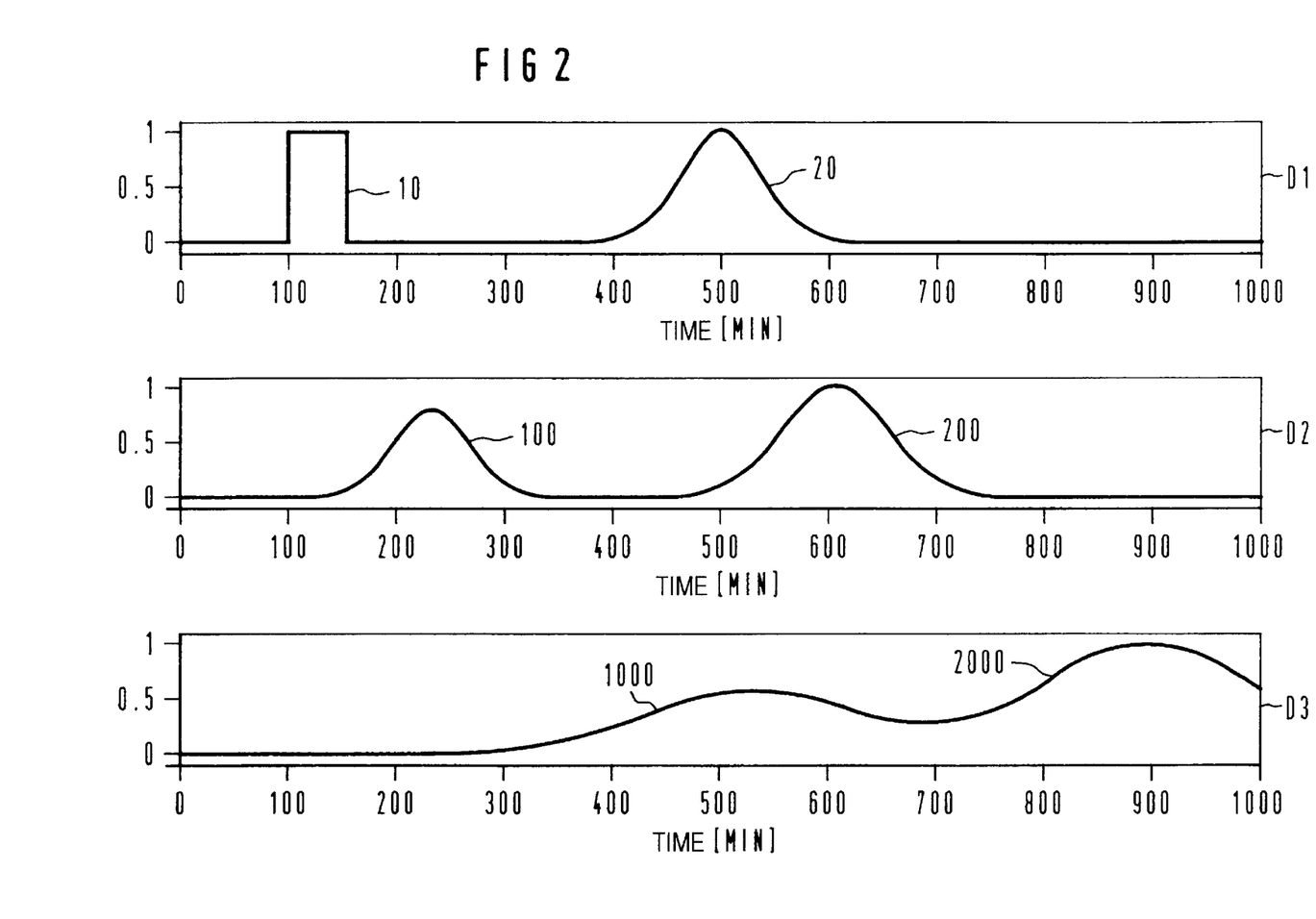
FIG. 2 is a series of graphs which show, by way of example, the treatment of the measured value from a time series in accordance with the method according to the invention.

Using three diagrams D1 to D3, FIG. 2 shows the input variables of the neural network which are subjected to a convolution using bell curves of different widths. In D1, for example, the network input variables 10 and 20 are represented in the original state. In diagram D2 these values from D1 are subjected to a convolution using a bell curve of narrow width, as is designated, for example, with curve G1 in FIG. 1, in order in this way to be able to obtain a measure of input variables from the recent past. The convolution result 100 represents the input 10 from diagram D1 and the convolution result 200 represents the input 20 from D1. In diagram D3, the input values from diagram D1 are represented using a convolution function of greater width, as is designated, for example, by curve G4 in FIG. 1. The convolution result 1000 here corresponds to the value 10 and the convolution result 2000 corresponds to the value 20 from diagram D1. Using the different diagrams, it can clearly be seen that, in the progress from diagram D1 to diagram D3 the values are averaged more and more and the transitions are continuously matched to one another. It can be seen particularly well in the case of diagram D3 that the transition from 1000 to 2000 is virtually smooth. Using a convolution of the time series in the manner of diagram D3, account is in particular taken of the fact that forwardly directed neural networks have no memory, or remembrance, and that values which lie far back in the past must also be taken into account as input variables for such networks. For example, a Gassian bell curve with a large variance is used for their convolution. Particularly good results are achieved with the process according to the invention if use is made, as the width of the convolution function, that is to say for example as the variance of the Gaussian curve, of a multiple of a known time constant of a process from which these input variables of the neural network are to be derived, since by this means a filtering effect for significant input variables is achieved.

Figure 3:
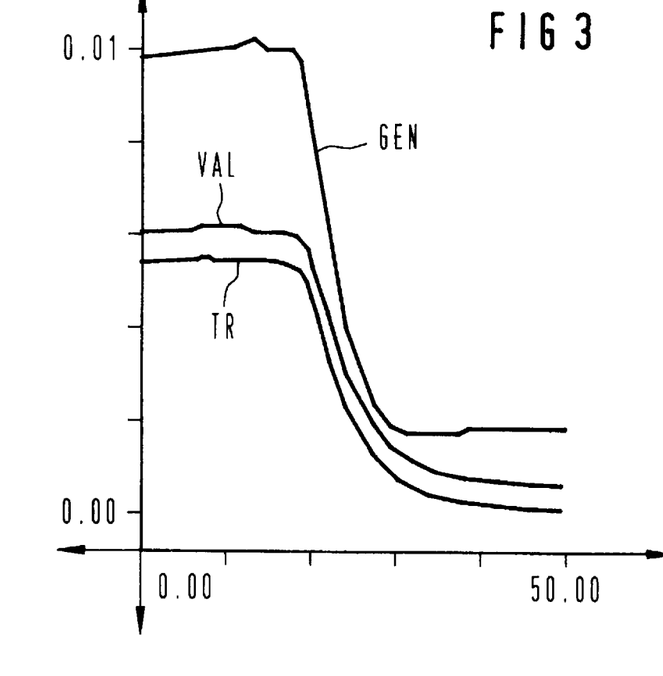
FIG. 3 is a graph which the effect in the case of using intervals of different length.

Represented in FIG. 3 are the learning curves of a neural network. Plotted to the right is the number of learning cycles and plotted upward is the error. The profile of the training curve is indicated by TR, the profile of the generalization curve with GEN and the profile of the validation curve by VAL. It can be clearly seen that a distinct drop in all three curves occurs at about 22. This time exactly represents the time at which the network was fed not only with current input variables but also with input variables from the past convoluted using a time constant of the process. As can be seen, a dramatic drop in the errors in all three regions occurs.

Figure 4:
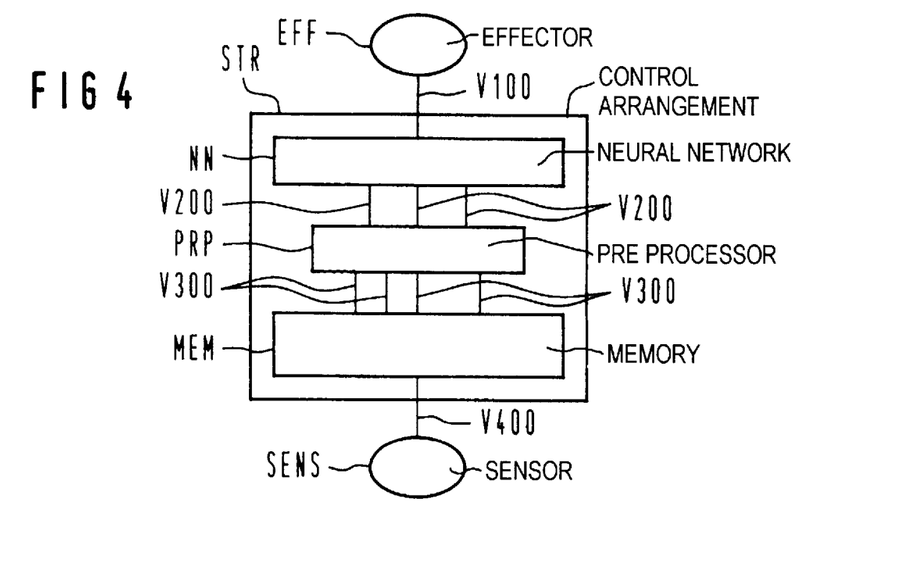
FIG. 4 is a block diagram shows an example of an arrangement according to the invention.

FIG. 4 shows an example of a control arrangement according to the invention for a chemical process. In detail, the control arrangement STR contains a sensor SENS, a memory MEM, a preprocessor PRP, and an effector EFF. The sensor is connected to the memory MEM via connecting lines V400 and the memory is connected to the preprocessor PRP via connecting lines V300. The preprocessor forwards its data to the neural network NN via connecting lines V200. From this data, the neural network generates an output variable for changing the chemical process by means of the effector EFF and forwards this data to the effector via the connecting line V100. Data output by the sensor SENS at discrete times are acquired in the memory MEM of this control arrangement according to the invention. From this data, the preprocessor PRP forms input variables for the neural network NN, by combining values of the measurement results of the sensor SENS lying further back in intervals whose length is selected to be greater the further these measured values lie back in the past. Subsequently, a convolution of the interval considered is carried out by the preprocessor PRP using a Gaussian bell curve or another ball-shaped function and a value which is representative of the overall interval is obtained therefrom. This value is fed to the neural network NN as an input variable, representative of the remaining values of the interval, together with a further value which, for example, may have been extracted according to the invention from a further interval range, or else is forwarded to the neural network from the memory. The neural network NN has been specially trained for the chemical process and now evaluates these input variables, which it obtains by means of lines V200, in order to form an input variable with which the chemical process can be influenced. For this purpose, for example, an effector EFF is provided. For example, using the sensor the phosphate content of waste water in a sewage treatment plant is detected and, using the effector, a precipitation agent is metered in, which is intended to precipitate the phosphate present in the waste water. In this case it is particularly desired that the precipitation agent be added in stoichiometric equilibrium, so that no reaction residues remain.

Figure 5:
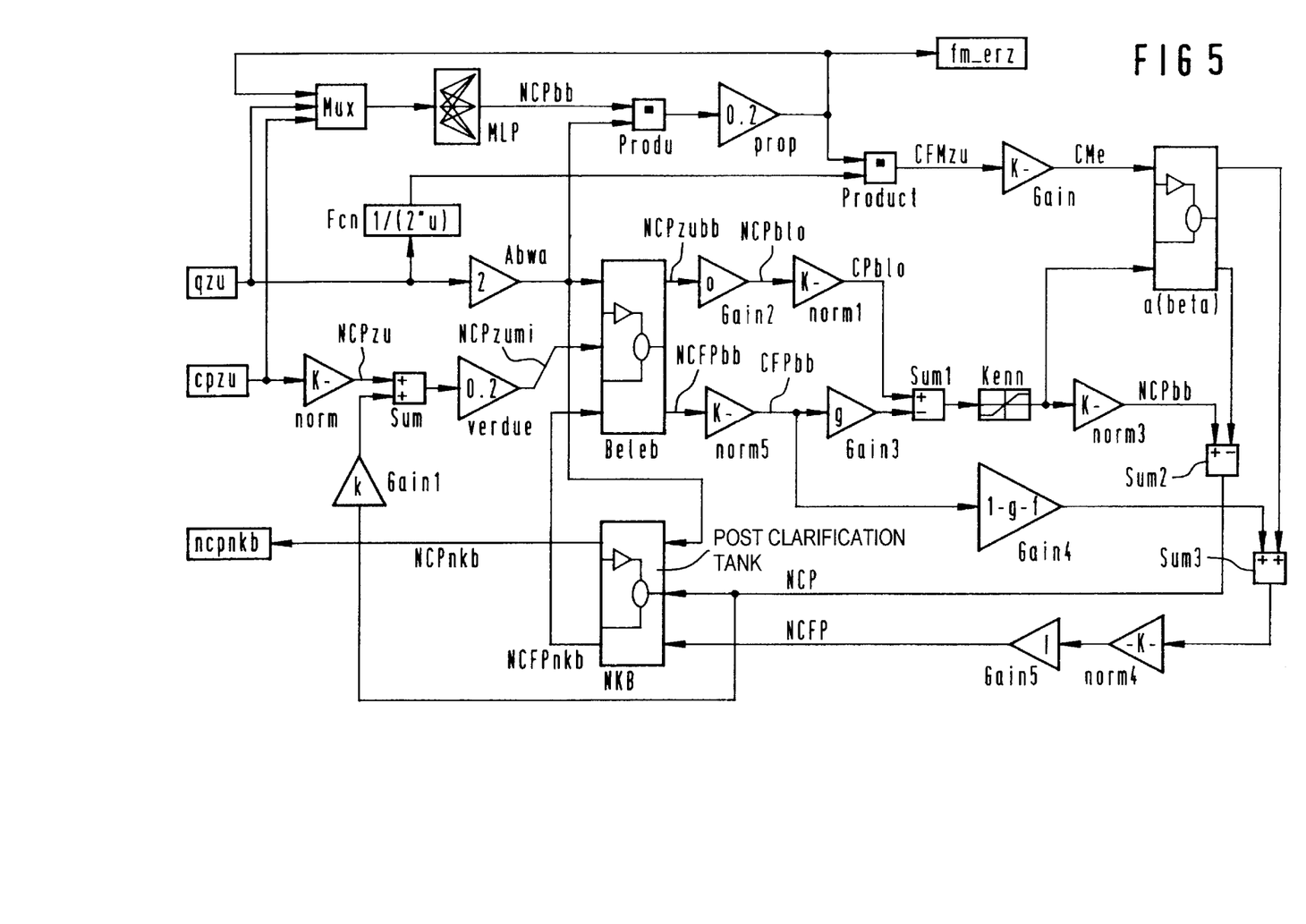
FIG. 5 shows a block circuit diagram of a sewage treatment plant which is operated in accordance with the process according to the invention.

FIG. 5 shows, as a sewage treatment plant, an example of a chemical process which can be controlled with the aid of the process according to the invention or of the control arrangement according to the invention. Precipitation agents having trivalent metal ions as active substance are generally used for the elimination of phosphates contained in the waste water. As an example, the elimination of the phosphate contained in the waste water in the activation tank of a sewage treatment plant may be represented in simplified form using the following differential equation:

$$\frac{d}{dt} CP = -\left(\frac{Q}{V}\right)CP + \left(\frac{Q}{V}\right)CP_{su}$$

Here, Q represents the quantity of waste water flowing through, V the volume of the tank and CP the phosphate concentration of the waste water. For training the neural network, it is possible for example to use practical data which have been determined on the basis of a real sewage treatment plant. FIG. 5 illustrates by way of an example the sequence of the phosphate elimination. The active sludge/precipitated sludge mixture which is deposited in the post-clarification tank NKB following the addition of the precipitation agent itself has phosphate-precipitating properties. During the activation process, it is fed back in activated form into the activating tank. Its precipitation action was estimated, for example, at about 3 days—an example of the long time constants which play a part within this system. For example, the values of a time series for the process according to the invention can therefore be convoluted using 3 days, that is to say 72 hours. As a result of these precipitation properties, the consumption of precipitation agent is reduced. The average residence time of the waste water in the activation and post-clarification tanks NKB is, for example, about 8 hours. However, in simultaneous precipitation, the most commonly used process, the phosphate precipitates out completely in fractions of a minute. In order to be able to model the simultaneous action of such different time constants neurally, the input data must be represented in a suitable manner.

Input data for the neural network are, for example, the variables waste water quantity qzu, phosphate concentration cpzu, quantity of phosphate MLP and quantity of precipitation agent CFMzu. Each series of input data is, for example, represented by a hierarchy of larger and smaller time-delayed windows. For the purposes of smoothing, the original time series is convoluted, for example initially using Gaussian bell curves of variously large variance, for example 24 hours, 8 hours and 2 hours. The convoluted time series are then displaced in relation to the unconvoluted time series by fixed time intervals in order to ensure that all the representative values of the time series can be fed to the neural network at the same time. Finally, the time series are scaled, for example to the interval [−1, 1]. The input variables derived in this way represent the averaged measured values from the past and enable the neural network to model the system in spite of the different time constants which reside in the system.

For the problem of phosphate elimination, the neural network is trained, for example, by means of stochastic learning, the learning rate being determined by the variance of the weight changes.

In this problem, as shown by experimental results, the models having radial base functions (RBF) are inferior to those having multilayer perceptrons (MLP) in terms of their generalization capability. The best modeling is preferably to be achieved using MLPs in which a linear image of the input data has first been trained. These are preferably trained for this purpose using time-delayed network inputs which are activated one after another and which have been convoluted here with $\delta$=24 hours, $\delta$=8 hours and $\delta$=2 hours, and in so doing the associated weights are in each case trained until convergence. Then, for example, the complexity of the network is reduced using known methods. This includes the fusing of highly-correlated nodes in the hidden layer, the deletion of less relevant input variables, and the removal of weights having severe scattering in relation to their magnitude. As a result of this network optimization, it is possible to prune, for example, 75% of the weights, and the generalization performance on the validation set can be raised considerably.

The evaluation of the process according to the invention showed that very good modeling is possible in the case of the procedures proceeding during the phosphate precipitation. The network achieves very good generalization performances on the original data for rainy weather, phosphate surges and dry weather. Of particular advantage is the high generalization performance for the network output which describes the phosphate concentration at the outflow of the activation tank. It is at precisely this point that the precipitation agent is added during simultaneous precipitation. For example, the network input variable phosphate concentration can be replaced here with corrected and more easily measured substitute variables, such as conductivity and turbidity of the waste water.

Although other modifications and changes may be suggested by those skilled in the art, it is the intention of the inventors to embody within the patent warranted hereon all changes and modifications as reasonably and properly come within the scope of their contribution to the art.

What is claimed is:

1. A process for conditioning an input variable for training and use of a neural network, comprising the steps of:
   training a neural network using the following steps a) to e):
   a) collecting from a physical process a set of values over time as input data,
   b) forming a time series from said set of values of an input variable by determining the input variable at discrete times,
   c) delimiting intervals within the time series in such a way that a length of the respective interval is selected to be greater the further the values therein lie back in the past,
   d) convoluting a first partial time series delimited by the first interval with an bell-shaped function to form an average and forming the first maximum value of the convolution result, e) and feeding the first maximum valve to the neural network which is representative of the first partial time series with another input value which is located within the time series but outside the first interval; and controlling the physical process using the neural network trained according to the forgoing steps a) to e), including:

conditioning input values to the neural network using the foregoing steps a) to e), and outputting the result from the neural network for control of the physical process.

2. A process as claimed in claim 1, further comprising the steps of:

delimiting a plurality of interval groups, wherein each at least two successive intervals of such an interval group have the same length, and following said step of feeding, determining a respective interval length of an interval group.

3. A process as claimed in claim 1, further comprising the step of:

selecting interval limits of two adjacent intervals such that the intervals have at least one value from the time series in common.

4. A process as claimed in claim 1, further comprising the step of:

matching a width of the bell-shaped curve to an same length interval to be convoluted therewith.

5. A process as claimed in claim 4, further comprising the step of:

providing a standard deviation of the magnitude of the interval length.

6. A process as claimed in claim 1, further comprising the step of:

selecting a Gauss distribution as the bell-shaped curve.

7. A process as claimed in claim 1, further comprising the steps of:

deriving input values from a system which has at least one known time constant, and selecting at least one interval length of the magnitude of the time constant, or a multiple thereof.

8. A process as claimed in claim 1, further comprising the step of:

feeding the input values to a forwardly directed neural network.

9. A process as claimed in claim 1, further comprising the step of:

normalizing the values of the series to a fixed interval.

10. A process as claimed in claim 1, wherein the step of training said neural network further comprises:

a first step of feeding unconvoluted values from the time series to the neural network and, in a second step, training said network with the input variables which result from the convolution of values from the time series from the past.

11. A process as claimed in claim 1, further comprising the step of:

forming at least one time series from measured values from a sewage treatment plant.

12. A control arrangement for a chemical process, comprising:

a) at least one sensor mounted for acquiring measured values of the chemical process;

b) at least one memory connected to said at least one sensor for storing the measured values sensed by said at least one sensor;

c) a processor connected to said at least one memory for processing the measured values stored in said at least one memory to produce conditioned input values;

d) a forwardly directed neural network connected to receive the conditioned input values from said processor; and e) at least one effector connected to receive an output from said forwardly directed neural network for influencing the chemical process and cause a change in the measured values sensed by said at least one sensor, f) said at least one memory being connected to store in the memory a time series that is formed from a set of the measured values measured at regular time intervals, the time series being fed to said processor;

said processor means being programmed to combine a plurality of the measured values in respective intervals in such a way that a length of the intervals within the time series is selected to be greater the further the measured values located therein lie back in the past, and deriving a single value from each interval by convolution with a bell-shaped curve, and feeding said single value from each interval together with a further value from the time series stored in the memory to the neural network as the conditioned input values, said neural network being connected to form from the conditioned input values a manipulated variable for the chemical process, and the manipulated variable being forwarded to the effector to control said chemical process.

13. A method for controlling a physical process utilizing an output quantity of a neural network, comprising the steps of:

measuring conditions of the physical process, said conditions being influenced by changes in the physical process;

collecting a set of values over time from the conditions of the physical process measured in said measuring step, said set of values being input data for the neural network, the set of values being including a variable having a relatively long time constant and a variable having a relatively short time constant;

forming a time series from said set of values by determining the input variable at discrete times;

delimiting intervals within the time series in such a way that a length of the intervals is selected to be greater the further the values therein lie back in the past;

convoluting a first partial time series delimited by the first interval with a bell-shaped function to form an average and forming the first maximum value of the convolution result;

feeding the first maximum value to the neural network which is representative of the first partial time series with another input value which is located within the time series but outside the first interval;

detecting an output quantity of the neural network; and controlling the physical process using the output quantity from the neural network, said controlling step including implementing a physical change to said physical process which results in a change in said predetermined conditions of said physical process being measured in said measuring step.

* * * * *